July 27, 1965     S. HORMATS ETAL     3,196,871
DIFFUSION TYPE PROTECTIVE ENCLOSURE
Filed Feb. 4, 1958     3 Sheets-Sheet 1

INVENTORS
Saul Hormats
Eugene Sovinsky
Ella B. Dwaayer
BY George Renehan
ATTORNEY July 27, 1965 S. HORMATS ETAL 3,196,871
DIFFUSION TYPE PROTECTIVE ENCLOSURE
Filed Feb. 4, 1958 3 Sheets-Sheet 2
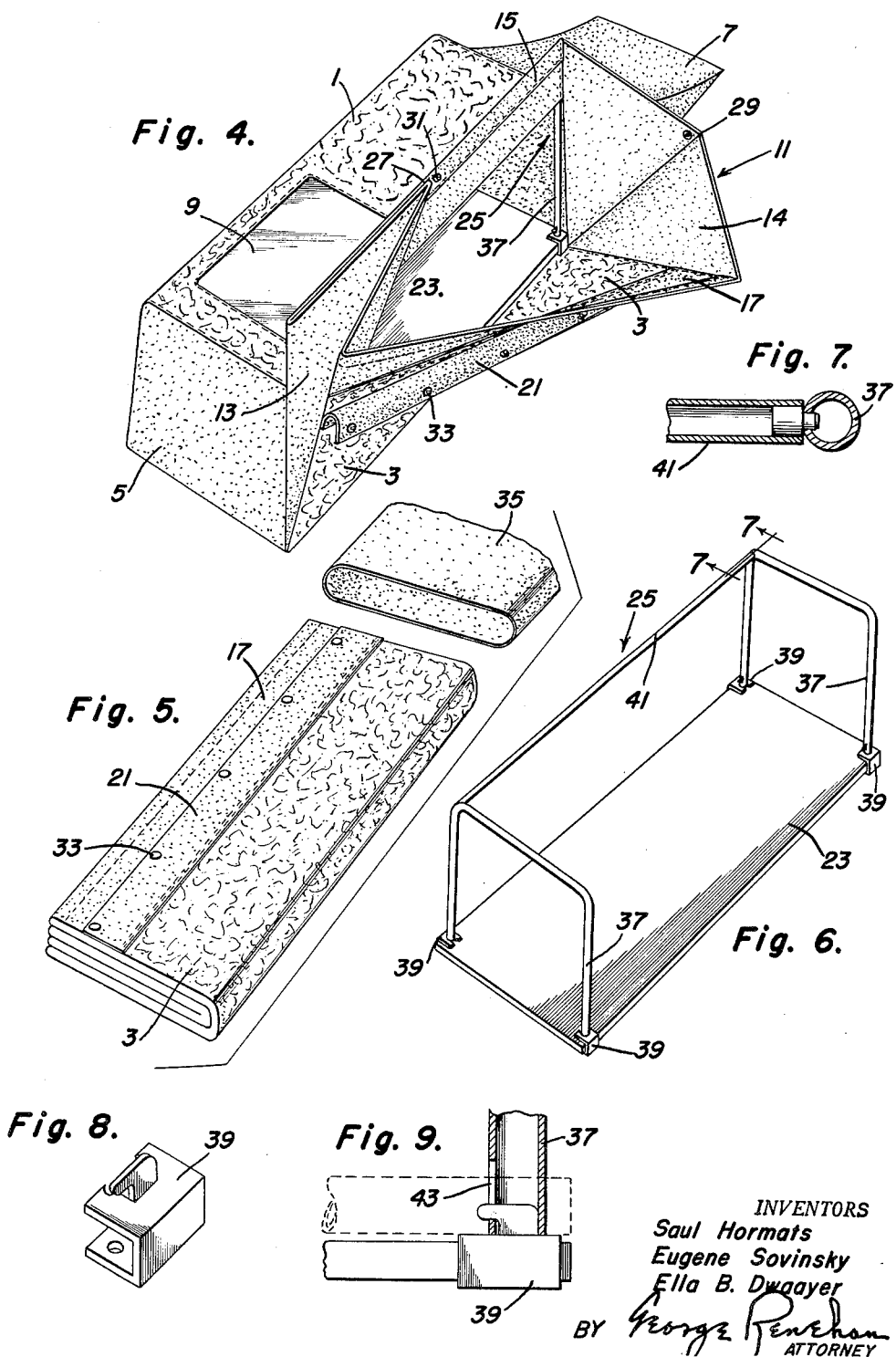
INVENTORS
Saul Hormats
Eugene Sovinsky
Ella B. Dwaayer
BY George Renehan
ATTORNEY July 27, 1965
S. HORMATS ETAL
3,196,871
DIFFUSION TYPE PROTECTIVE ENCLOSURE
Filed Feb. 4, 1958
3 Sheets-Sheet 3
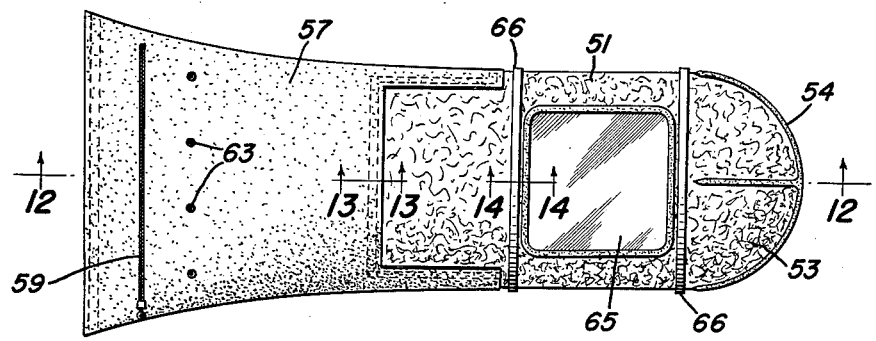
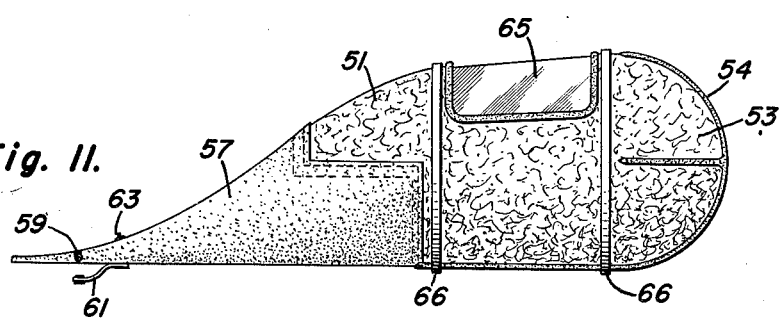
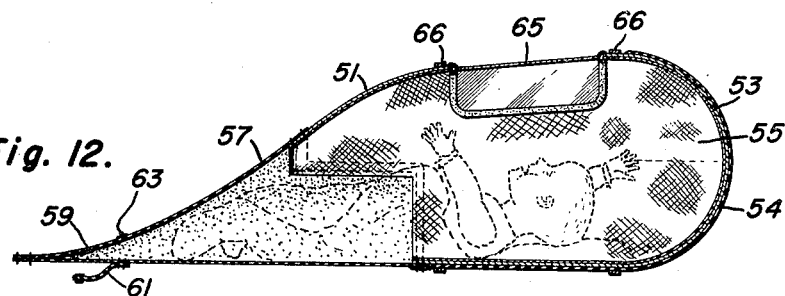
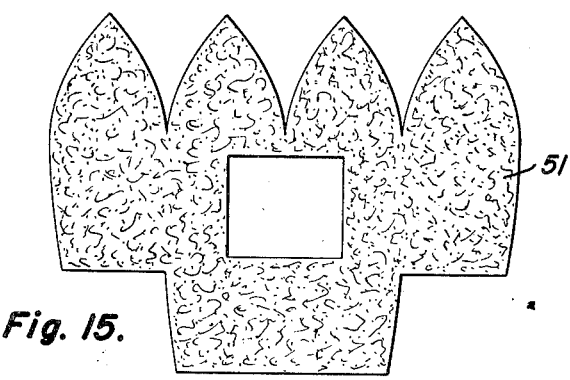
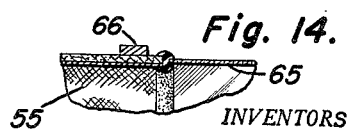
INVENTORS
Saul Hormats
Eugene Sovinsky
Ella B. Dwgayer
BY George Renehan
ATTORNEY

3,196,871
DIFFUSION TYPE PROTECTIVE ENCLOSURE

Saul Hormats, Pikesville, Eugene Sovinsky, Baltimore, and Ella B. Dwaayer, Magnolia, Md., assignors to the United States of America as represented by the Secretary of the Army
Filed Feb. 4, 1958, Ser. No. 713,273
6 Claims. (Cl. 128—140)
(Granted under Title 35, U.S. Code (1952), sec. 266)

The invention described herein may be manufactured and used by or for the Government of the United States of America for governmental purposes without payment to us of any royalty thereon.

This is a continuation in part of appliaction Serial Number 423,258, filed April 14, 1954, now abandoned.

This invention relates to diffusion type protective enclosures for protecting human beings or animals from the effects of atmospheric pollution in the form of gases, aerosols, smokes, or bacteria.

In order to provide protection from war gases and other types of atmospheric contamination, it is the practice to draw air through filtering materials which by physical entrainment, adsorption or chemical reaction eliminate the undesirable material.

To provide individual protection, the filter material is mounted on a gas mask and at each breath the wearer must physically draw the air through the mass of filtering material. In collective protectors, such as shelters or protectors for tanks, pumping means is provided to pass the air through the filtering material.

Gas masks of the type described above are obviously not well suited to use by small children or by animals. The necessity for pumps in connection with the collective protectors greatly increases the complexity of the installation.

We have devised a protector operating on a different principle, namely diffusion. We utilize a relatively thin fibrous material of such area that the removal of carbon dioxide and its replacement by oxygen takes place by diffusion, with no necessity for a net flow of air through the filter. Thus, infants or animals can simply be placed in the protector and need exert no more effort than is involved in normal breathing. Similarly a group of persons whose breathing will not, of course, be synchronized and who therefore will not produce definite pressure change within the enclosure, may occupy a single enclosure without the necessity for using pumping equipment.

Diffusion is governed by Graham's law. A statement of this law is given in Walker, Lewis, McAdams and Gilliland, Principles of Chemical Engineering (1937), pages 317 and 318.

The "coefficient of proportionality" referred to by Walker et al. may be expressed as a value termed "diffusivity," "diffusion coefficient" or "diffusion constant" for a specific gas in a given material. The diffusion of one gas through another is discussed in Perry, Chemical Engineers Handbook, 3rd Edition, pages 538–540 and the diffusivities of various gases in air are given, the diffusivity of carbon dioxide in air being .164 sq.cm./sec. When diffusion is through a porous medium the same basis equations hold, but the diffusivity of a given gas has a different numerical value than when the diffusion is through air. We employ the carbon dioxide diffusivity to characterize out material.

Under the condition prevailing in our enclosures, i.e., a carbon dioxide of one or two percent within the enclosure and negligible (for design purposes) carbon dioxide in the ambient atmosphere, the equation for the diffusion of carbon dioxide through the wall becomes $$Q = ADV/L$$

where $Q$ is the volume of carbon dioxide measured at atmospheric pressure and ambient temperature, diffusing through the wall in one second, in cubic centimeters, $A$ is the area over which diffusion takes place in square centimeters, $L$ is the wall thickness in centimeters, $V$ is the fraction by volume of carbon dioxide in the air within the enclosure and $D$ is the carbon dioxide diffusivity of the material in sq.cm./sec.

We utilize material comprising one or more fibrous sheets impregnated with activated carbon. This material may be of various physical forms. One form consists of filter paper into which finely divided activated carbon has been brushed in an amount of up to about 26% by weight, several sheets being employed. Another form which we have found highly suitable consists of a fibrous pad of about 4.0 to 4.5 mm. thickness impregnated with about 30% to 70% by weight of carobn in the minus 50 mesh size range and stabilized by a suitable adhesive.

Still another form, particularly suitable for rooms and sheltsrs is a carbon-impregnated fiber board about ¼ in. thick and containing from 15 to 50 percent activated carbon.

These materials effect a purification in several different ways. There is, of course, a physical exclusion of airborne particles. The activated carbon serves to selectively adsorb certain liquids and gases. Moreover, since the filter is a microporus structure and is operating under conditions of diffusion, the phenomenon of selective diffusion comes into play. As is well known, see Walker et al. supra, the rate of diffusion depends on the molecular weight of a gas, being greater for a gas of low molecular weight. Many of the highly toxic agents used as war gases have molecular weight which are much higher than the atmospheric gases and therefore diffuse at a much slower rate.

The slow penetration by diffusion of these high-molecular weight gases provides optimum conditions for their adsorption by the activated carbon.

We obtain our desired mode of operation by the use of a suitably large area of filter materiall. The area required is governed by several factors. The carbon dioxide concentration permissible in the enclosure is one governing factor. This permissible concentration varies with the individual. An adult can tolerate a higher concentration than an infant. The tolerance for animals varies from that of humans. The amount of carbon dioxide produced also varies with the individual. For conditions of rest, the amount produced varies with the weight and the basic metabolism rate of the individual. For conditions of activity, the amount produced increased with the amount of activity. The amount of carbon dioxide to be disposed of (which is governed by the factors discussed above) and the diffusivity of the filter materials determine the area required.

The material should have a carbon dioxide diffusivity falling in the range 1.5 to $7.0 \times 10^{-2}$ sq. cm./sec., i.e., roughly $\frac{1}{10}$ to $\frac{1}{2}$ the diffusivity of carbon dioxide in air. The diffusivity is a measure of the porosity of the material. The fibrous pad described above, which is officially termed "gas-aerosol filter material," ordinarily has a diffusivity in the upper portion of the range while the carbon impregnated fiber board ordinarily has a diffusivity in the lower part of that range.

These values of diffusivity are of an entirely different order of magnitude than those for certain other materials that have been considered as diffusion membranes for gases, e.g. natural rubber. We have found by experiment that dentist's dam, about .010 in. in thickness, requires 250 times the area of gas-aerosol filter material to diffuse the same amount of carbon dioxide, giving a carbon dioxide diffusivity of about $9 \times 10^{-6}$ sq. cm./sec.

Such thin rubber, moreover, does not sufficiently resist penetration by organic liquids to afford protection from liquid toxic agents.

As has been pointed out above the area required is governed in part by the amount of carbon dioxide that may be tolerated in the enclosure and the amount exhaled by the human beings or animals that are to occupy the enclosure. When the enclosure is to be occupied by human beings, we find that the greater tolerance for carbon dioxide on the part of adults may be balanced against their greater carbon dioxide output and that the maximum carbon dioxide content of the air in the enclosure may be taken at 2% by volume and the minimum amount to be dissipated at 480 cc./minute or 8 cc./second for each person occupying the enclosure. In the equation for diffusion given above, then $Q=8$ and $V=.02$. Solving for A we obtain $A=400 \ L/D$ where A is the minimum area of diffusion material required in square centimeters, L is the thickness of the material in centimeters and D is the carbon dioxide diffusivity of the material in sq. cm./sec. It will be noted that the value $L/D$ is a measure of the resistance of a given sheet of material to diffusion. For a typical 4 mm. gas-aerosol filter material having a diffusivity of $.5 \times 10^{-2}$ sq. cm./sec. at least about 2500 sq. cm. should be employed for each individual. For a typical ¼ in. carbon-impregnated fiber board having a carbon dioxide diffusivity of about $2 \times 10^{-2}$ sq. cm./sec. at least about 13,000 sq. cm. should be employed for each individual. When practicable, the area should be increased somewhat above these values. For example, we prefer to employ about 3000 sq. cm. of the gas aerosol filtered material for either an adult or an infant.

Since oxygen has a lower molecular weight than carbon dioxide it diffuses more rapidly. Sufficient area to eliminate the carbon dioxide is therefore ample to provide for replacement of the oxygen.

In the summary, the action is as follows: Carbon dioxide and water vapor diffuse outwardly, oxygen diffuses inwardly, while the nitrogen content remains unchanged. Particulates, including biological agents and radioactive dust are either deflected from the surface or mechanically filtered out. High molecular weight toxic gases and organic liquids are absorbed by the activated carbon.

Water vapor is also removed by diffusion. While the maintenance of a relatively low humidity is desirable from the standpoint of comfort and may call for a somewhat greater area than given above it is not critical except under unusually severe conditions of heat and external humidity.

Typical carbon-containing fibrous materials will now be described in more detail.

The presently preferred material for use in the infant protector shown in the drawing and subsequently described in detail is that designated by the Chemical Corps. United States Army, as "Gas-aerosol Filter Material Type "I." An acceptable embodiment of this material is as follows:

| | |
|---|---|
| Glass fibers (about 1 micron diameter) | 27.6% by wt. |
| Vinyon HH (vinyl chloride-vinyl acetate copolymer) 3 den. 1¼ staple | 36.2% by wt. |
| Acrilan (polyacrylonitrile) 3 den. 2" staple | 36.2% by wt. |
| (Above percentages taken on total fiber content) | |
| Thickness | 4.0 mm. |
| Charcoal activated (ASC Whetlerite) | 7–8 g./100 sq. cm. |
| Fiber content | 4 g./100 sq. cm. |
| Total density | 11–12 g./100 sq. cm. |
| Diffusivity | $6.5 \times 10^{-2}$ sq. cm./sec. |

The material is formed by an air-forming process and then hot-pressed. The thermoplastic vinyon fibers act as an adhesive to stabilize the other fibers and the charcoal. Methods by which this and similar materials may be made are described in application Serial No. 653,504, filed April 17, 1957 now abandoned by Arthur W. Plummer, and application Serial Nos. 425,720, now Patent No. 2,882,997 and 523,100, now Patent No. 3,015,367, filed April 26, 1954 and July 19, 1955, respectively, by Stanton B. Smith. Other suitable gas-aerosol filter materials composed of organic fibers, extremely fine asbestos fibers or glass fibers, and activated charcoal, but not containing the thermoplastic fibers may be made by the usual papermaking processes, provided that, when the desirable ASC Whetlerite (charcoal impregnated with silver, copper, and chromic oxides) is used, the drying temperatures are kept below 120° C. to avoid deactivation of the charcoal. A suitable wet process for making the material is described in application Serial No. 580,683, filed April 25, 1956, now Patent No. 3,034,947, by John R. Conlisk et al. One suitable carbon impregnated board is as follows:

Fiber: 90% aspen (hardwood) insulating board stock, 10% papermill groundwood.
Charcoal: ASC Whetlerite, pulverized, 17–20% on total weight of board.
Density: .38 g./cc.
Thickness: about ¼ in.
Carbon Dioxide Diffusivity: 1.7 to $2.1 \times 10^{-2}$ sq. cm./sec.

A method for making this material is described in the Conlisk et al. application identified above.

The materials described above are to be distinguished from those produced by the process of Patent 1,818,155 to Oglesby et al., which are produced by passing gaseous suspension of carbon black through the material. Activated charcoal is a highly porous material, the pores being of the same order of magnitude as the entire particles employed in the Oglesby process. The latter process is intended to, and does, merely enhance the aerosol filtration efficiency of the filter without providing significant adsorptive capacity. The so-called "activated carbon blacks" also possess insufficient adsorption capacity for gases to be useful for our purposes.

The material should have a thickness of about 4 to 8 mm. For material of a given diffusivity, the amount of a given gas diffusing under given conditions in a given time is inversely proportional to the thickness of the material. The effective life of the material is a function of its carbon content. If therefore, protection over a long period of time is important it may be desirable to make the material thicker and increase the area. The minimum thickness is governed primarily by the ability of the fibrous material to prevent penetration by aerosols. Regardless of the material of which the wall of the enclosure is made of, the thickness should have a thickness of at least 2.5 mm.

The volume of the enclosure should be such that breathing will produce negligible changes in pressure.

If the volume were made too small, it would be necessary for the individual to draw air through the material with each breath, as in the usual gas mask. However, with enclosures of the usual shape, volume is not a problem, as the use of the wall areas given above will inherently give sufficient volume.

In the accompanying drawings, we have shown two modifications of an infant protective bag embodying our invention.

FIG. 4 is a perspective view of the modification of

Figure 1:
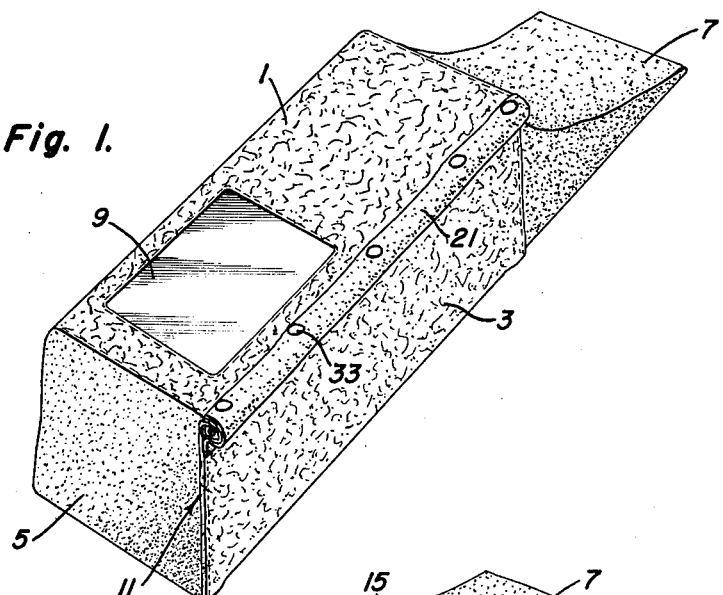
FIG. 1 is a perspective view of a first modification of an infant protective bag in a closed condition.

FIG. 1 in a partially closed position showing the operation of the gusset closure.

FIG. 5 is a perspective view of the modification of FIG. 1 collapsed and prepared for storage.

FIG. 6 is a perspective view of the collapsible frame of the modification of FIG. 1 with the covering removed.

FIG. 7 is a section taken on line 7—7 of FIG. 6.

FIG. 8 is a perspective view of one of the mounting brackets for the frame shown in FIG. 6.

FIG. 9 is a fragmentary view partially in section showing the relationship of a mounting bracket and a leg of the frame shown in FIG. 6.

FIG. 10 is a plane view of a second modification of an infant protective bag.

FIG. 11 is a side view of the modification of FIG. 10.

FIG. 12 is a section taken on line 12—12 of FIG. 10.

FIG. 13 is a section taken on line 13—13 of FIG. 10.

FIG. 14 is a section taken on line 14—14 of FIG. 10.

FIG. 15 is a developed view of the filter pad of FIG. 10.

The modification of FIGS. 1 to 9 will now be described in detail. These figures show a collapsible infant protective bag, having an interior metallic frame. FIG. 1 shows the bag as it appears when in use. It comprises a top 1, a front side wall 3 and a rear wall not shown, formed of carbon-impregnated fibrous gas-aerosol filtering material such as is described above. It also includes a head end wall 5 and an extension bag 7 of gas-impervious sheeting such as butyl rubber coated cloth or a flexible plastic material. The sheeting may be either transparent or opaque. A window 9 is preferably provided in the top wall, particularly if the sheeting is opaque. The bag also includes a gusset closure 11, which forms a gas-tight connection between side wall 3 and top 1.

Figure 2:
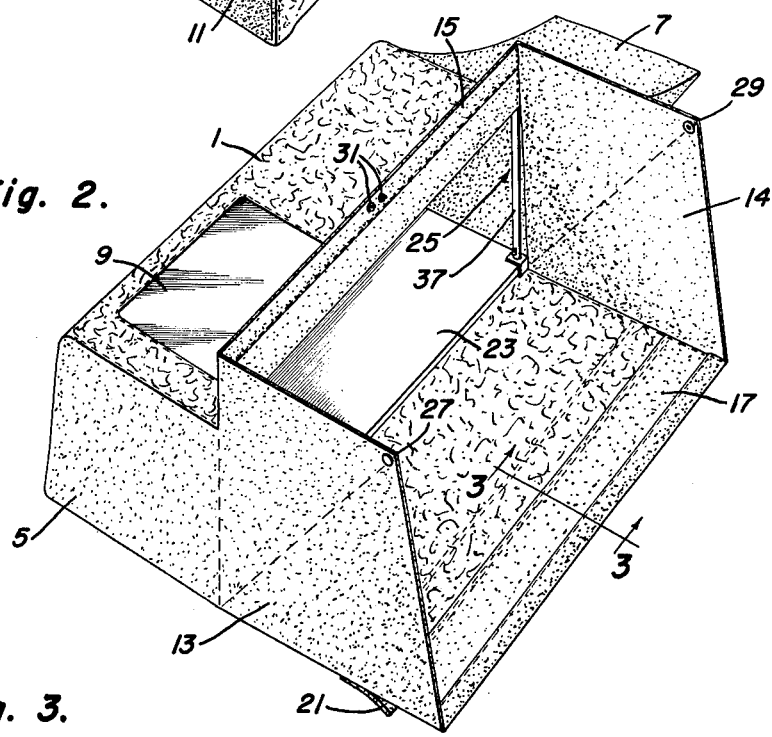
FIG. 2 is a perspective view of the modification of FIG. 1 in an open condition.
Figure 3:
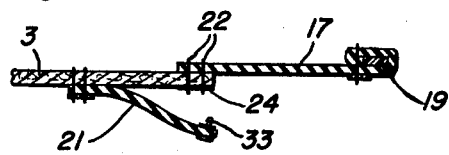
FIG. 3 is a section taken on line 3—3, FIG. 2.

FIGURES 2, 3 and 4 show the structure and mode of operation of gusset closure 11. It comprises gusset sides 13 and 14 which are made of the same type sheeting as end wall 55. Flaps 15 and 17, likewise formed of this material, are secured to the top 1 and the side wall 3, respectively. These flaps are stiffened as shown in FIGURE 3 by plastic strips such as 19. As also shown in FIGURE 3, flaps 15 and 17 are sewed to the filter material at seams 22 which are sealed by latex 24. A cover strip 21 is secured to the side wall 3.

It may be mentioned at this point that the bag also comprises a floor board 23 and a collapsible metal frame 25. In actual use, it would be provided with a suitable mattress or pad, not shown.

FIGURE 2 shows the bag in an open position ready to receive an infant. When the child has been placed inside, the bag is closed in the following manner (see FIGURES 2 and 4). Corners 27 and 29 of gusset sides 13 and 14, respectively, are brought up and fastened to the middle of flap 15 by snap fasteners 31, thus folding the gusset sides 13 and 14 in the manner shown at the left hand side of FIGURE 4. The stiffened edges of flaps 15 and 17 are then brought together and, for convenience, may be fastened in any suitable manner. Flaps 15 and 17, together with the folded gusset sides 13 and 14, are then rolled up. Cover strip 21 is then wrapped around the roll and fastened to the edge of top 1 by the means of snap fasteners 33.

When not in use, the bag may be folded up, as shown in FIGURE 5, and placed in a suitable receptacle 35. In order to make this operation possible, the frame 25 comprises U-shaped leg members 37 mounted in brackets 39 secured to floor board 23. A removeable rod 41 mounted in sockets in legs 37 (see FIGURE 7) completes the frame structure. The leg members 37 are selected as shown at 43 (FIGURE 9). When it is desired to fold up the bag, extension bag 7 is first tucked inside or otherwise secured in a folded condition. Rod 41 is then removed from its sockets and may be placed on the floor board 25. Legs 37 are then laid down as shown by the dotted lines in FIGURE 9. The head end wall 5 and rear side wall, not shown, are then folded inwardly with top 1 covering them. Front side wall 3 and its associated gusset parts are then folded over the top (see FIGURE 5). The device may then be placed in receptacle 35 which may be, for example, a plastic bag.

Another modification is shown in FIGS. 10 to 15 which illustrate a simple structure suitable either for infants too small to move themselves about or on the other hand for persons having sufficient maturity to remain in the correct position. This bag comprises a filter having a generally cylindrical portion 51 and a substantially hemispherical portion 53, formed of the carbon-impregnated fiber filter material described in the introductory portion of this specification. The hemispherical portion 53 is shown as provided with sealed seams 54. It is lined with muslin 55. Secured to the filter is an extension bag 57 formed of gas-impervious sheeting and having an opening closed by a side fastener ("zipper") 59. For greater tightness, the end of the bag is rolled up and cover strip 61 wrapped around the roll and secured to snap fasteners 63. A window 65 of clear plastic is provided. The filter is supported by stiffening hoops 66 which may permanently or removably secured thereto. This modification is a very simple and economical structure, but because of its non-rigid nature is not suitable for larger infants who might move about so that their heads would beat the foot of the bag.

While we have described the detailed structure of infant protective bags only, it will be obvious that the enclosures may be made much larger without departing from the principles of our invention and may take the form of shelters sufficiently large to be occupied by a number of adults. It is also obvious that numerous other modifications may be made.

We therefore desire our invention to be limited only by the scope of the appended claims.

We claim:

1. A protective enclosure comprising a wall completely enveloping said enclosure, a portion of said wall being a sheet of porous fibrous material impregnated with activated charcoal, said charcoal constituting at least 15 percent by weight of said material, said material having a carbon dioxide diffusivity falling in the range $1.5 \times 10^{-2}$ to $7.0 \times 10^{-2}$, sq. cm./sec., and a thickness of at least about 2.5 mm., the area of said material being sufficiently great to dispsel substantially solely by diffusion the carbon dioxide produced by any mammals that may occupy said enclosure, the remainder of said wall being impervious to gas.

2. A protective enclosure as defined in claim 1 wherein said fibrous material comprises a pad of intermingled fibers impregnated with about 30% to 70% by weight of activated carbon.

3. A protective enclosure as defined in claim 2 wherein said pad has a thickness of the order of 4 mm. and a carbon dioxide diffusion coefficient of the order of $6.5 \times 10^{-2}$ sq. cm./sec.

4. A protective enclosure as defined in claim 3 wherein said enclosure is of size to receive at least one human being and said filter material has an area of at least 2500 sq. cm. for each human being.

5. A protective enclosure sufficiently large to be occupied by at least one human being, comprising a wall completely enveloping said enclosure, at least a portion of said wall being a sheet of porous fibrous material impregnated with activated charcoal, said charcoal constituting at least 10 percent by weight of said material, said material having a carbon dioxide diffusivity falling in the range $1.5 \times 10^{-2}$ to $7.0 \times 10^{-2}$ sq. cm./sec. and a thickness of at least about 2.5 mm., the area of said material in square centimeters being at least 400 L./D. for each human being that may occupy said enclosure, L being the thickness of said material in centimeters and D being the carbon dioxide diffusivity of said material, any portion of said wall not formed of said material being substantially impermeable to gas.

6. A protective enclosure as defined in claim 5, wherein said material has a thickness in the range of 4 to 8 mm.

References Cited by the Examiner

UNITED STATES PATENTS

| | | |
|---|---|---|
| 693,638 | 2/02 | Brewer. |
| 1,812,380 | 6/31 | Stelzner _____ 128—140 |
| 1,818,155 | 8/31 | Oglesby et al. |
| 2,705,489 | 4/55 | Trexler _____ 128—1 |
| 2,771,021 | 11/56 | Buckley. |
| 3,015,367 | 1/62 | Smith et al. |
| 3,034,947 | 5/62 | Conlisk et al. |

FOREIGN PATENTS 806,776   10/36   France.

OTHER REFERENCES

Gregory: "Use and Applications of Chemicals and Related Materials," Reinhold Publishing Corp. (1939), pp. 166–167.

U.S. Bureau of Standards, "Journal of Research," vol. 13, December 1934, pp. 879–385.

Perry: "Chemical Engineers Handbook," Third Edition, McGraw-Hill Book Co., New York (1950), pp. 754, 904–905.

REUBEN FRIEDMAN, *Primary Examiner*.

HARRY B. THORNTON, HERBERT L. MARTIN, ROGER L. CAMPBELL, LEON D. ROSDOL,
*Examiners*.